Patented Mar. 5, 1940

2,192,583

UNITED STATES PATENT OFFICE 2,192,583

SYNTHETIC RESIN COATING COMPOSITION

Charles Bogin, Terre Haute, Ind., assignor to Commercial Solvents Corporation, Terre Haute, Ind., a corporation of Maryland No Drawing. Application July 21, 1937, Serial No. 154,757

2 Claims. (Cl. 260—32)

My invention pertains to coating compositions, and more particularly to coating compositions containing polymerized vinyl compounds.

Various types and grades of synthetic resins have been produced by the polymerization of vinyl compounds. These resins, in general, possess very interesting properties, being of great physical and chemical stability and not readily affected by concentrated hydrochloric or hydrofluoric acids, 50% sodium hydroxide solution, alcohols, or even by a mixture of potassium dichromate and sulphuric acid. On account of this superior stability, synthetic resins produced by the polymerization of vinyl compounds have been suggested for numerous uses in the finishing field. They, however, possess certain general defects which make their use for coating purposes in particular somewhat difficult. For example, contact at elevated temperatures with certain metals such as zinc, iron, or tin, causes rapid decomposition of polymerized vinyl compounds prepared from vinyl chloride with the liberation of hydrochloric acid. The presence of pigments containing iron or zinc has the same effect.

Another of the important handicaps up to the present time in the use of vinyl resins in coating compositions has been the lack of satisfactory solvents. I have now discovered that the nitroparaffins are particularly good solvents for the vinyl resins best suited for use in coating compositions such as, for example, resins resulting from the conjoint polymerization of a vinyl halide with a vinyl ester of a lower aliphatic acid and an object of my invention is the use of such solvents either alone or in conjunction with suitable diluents in the production of vinyl resin coating compositions.

A suitable form of vinyl resin for use in coating compositions is described in United States Patent No. 1,935,577, granted November 14, 1933 to E. W. Reid and is produced by conjointly polymerizing from about 90 parts to about 10 parts of vinyl chloride with from about 10 parts to about 90 parts of vinyl acetate.

The nitroparaffins which I use as solvents for the vinyl resins in my improved coating compositions may be produced in accordance with the process disclosed in Patent No. 1,967,667, granted July 24, 1934 to H. B. Hass, E. B. Hodge and B. M. Vanderbilt, although they may of course be made by other processes, if desired. Any of the nitroparaffins of suitable boiling point and rates of evaporation, with the exception of nitromethane, may be used as solvents for the preferred form of vinyl resin disclosed above. Examples of such suitable materials are nitroethane, 1-nitropropane, 2-nitropropane, the nitrobutanes, the nitropentanes, etc., or mixtures thereof from which preferably the nitromethane has been removed. Although the nitromethane itself is not a solvent for the vinyl resin, it becomes so when mixed with suitable proportions of a coal tar hydrocarbon like toluol. On account of the high tolerances of the nitroparaffins for the coal tar hydrocarbons such as toluol large amounts of the latter may be used as diluents for nitroparaffin solutions of vinyl resins.

Other materials ordinarily used in coating compositions containing synthetic resins may also be employed in my improved vinyl resin coating composition. For example, plasticizers such as camphor, tricresyl phosphate, dibutyl phthalate, oxidized oils, or the like may be incorporated. Other resins, either natural or synthetic, may likewise be used in the composition. Also, pigments or dyes may be added provided care is taken to exclude zinc and iron compounds.

The viscosities of vinyl resin coating compositions, just as in the case of most other coating compositions, are of considerable importance regardless of the method of application employed. Inasmuch as the character of the solvent mixture employed affects not only the concentrations of resins and the character of the coating obtainable but also the viscosities of the liquid coating compositions, the choice of proper solvents to use with vinyl resins is highly important and depends to a large extent on the viscosity characteristics of the solutions obtained therewith. Most of the solvents previously suggested for use with vinyl resins are not suitable for the preparation of satisfactory coating compositions because solutions of the resin made with them not only possess high initial viscosities, but in addition, tend to increase in viscosity on aging and ultimately set to solid gels. As will be seen from the tables given below, the nitroparaffins give solutions having much lower viscosities than are obtainable with one of the best of the previously known solvents, i. e., methyl isobutyl ketone, and, in addition, such solutions show a decreased tendency to gel on aging. This property of the nitroparaffins therefore permits the production of more concentrated and more stable solutions of the vinyl resins.

TABLE I.—(Concentration of resin:20 grams per 100 cc. of liquid)

| Number | Solvent | Percent solvent | Percent toluol | Viscosity in centipoises at 40° C. | Viscosity in centipoises at 30° C. | Viscosity in centipoises at 20° C. |
|---|---|---|---|---|---|---|
| 1 | 1-nitropropane | 20 | 80 | 73 | 114 | 226 |
| 2 | Methylisobutylketone | 20 | 80 | 100 | 204 | Gelled |
| 3 | 1-nitropropane | 33.3 | 66.7 | 64 | 92 | 150 |
| 4 | Methylisobutylketone | 33.3 | 66.7 | 77 | 120 | 242 |
| 5 | 1-nitropropane | 46.6 | 53.4 | 59 | 84 | 126 |
| 6 | Methylisobutylketone | 46.6 | 53.4 | 71 | 105 | 181 |
| 7 | 1-nitropropane | 60 | 40 | 56 | 81 | 120 |
| 8 | Methylisobutylketone | 60 | 40 | 67 | 101 | 150 |

Table II, below, shows the effect of aging determined on another sample of vinyl resin.

TABLE II.—(Concentration of resin:20 grams per 100 cc. of liquid)

| Number | Solvent | Percent solvent | Percent toluol | Original viscosity in centipoises at 40° C. | Viscosity in centipoises at 40° C. | | |
|---|---|---|---|---|---|---|---|
| | | | | | After 1 month's storage at room temp. | After 4 months' storage at room temp. | After 4 months' storage at 31° C. |
| 1 | 1-nitropropane | 20 | 80 | 73 | 92 | 114 | 90 |
| 2 | Methylisobutylketone | 20 | 80 | 100 | 153 | 206 | 187 |
| 3 | 1-nitropropane | 33.3 | 66.7 | 64 | 77 | 90 | 77 |
| 4 | Methylisobutylketone | 33.3 | 66.7 | 77 | 120 | 138 | |
| 5 | 1-nitropropane | 46.6 | 53.4 | 59 | 71 | 77 | 77 |
| 6 | Methylisobutylketone | 46.6 | 53.4 | 71 | 92 | 114 | 90 |
| 7 | 1-nitropropane | 60 | 40 | 56 | 66 | 65 | 65 |
| 8 | Methylisobutylketone | 60 | 40 | 67 | 77 | 101 | 90 |

As indicated by the tables given above, with an increase in the proportion of the diluent added to vinyl resin solutions, an increase in viscosity results, and under certain conditions the viscosity increase with poorer thinner mixtures becomes very great. This increase in viscosity, in general, depends upon such factors as, temperature of the solution, the concentration of the resin in solution, the viscosity characteristics of the particular grade of resin employed, etc. It will be evident, therefore, that the proportion of diluent to nitroparaffin employed in any particular coating composition will vary with the particular diluent, the character and concentration of the resin, the probable length of time before use of the composition, and other such factors.

The following example will illustrate the use of nitroparaffins in unpigmented vinyl resin coating compositions:

Example I

Vinyl resin _____ grams per 100 cc __ 13
Dibutyl phthalate _____ 3
1-nitropropane _____ per cent __ 30
Toluol _____ do ____ 70

The following is a formula for a similar composition containing pigments and another synthetic resin:

Example II

Vinyl resin _____ grams per 100 cc __ 13
Ester gum _____ 5
Dibutyl phthalate _____ 4
Titanium dioxide pigment _____ 5
Carbon black _____ 1
Nitrobutane _____ per cent __ 40
Toluol _____ do ____ 60

The following example will illustrate the use of a mixture of nitroparaffins as the solvent:

Example III

Vinyl resin _____ grams per 100 cc __ 13
Ester gum _____ 4
Dibutyl phthalate _____ 3.0
The vapor phase nitration product of propane from which nitromethane has been removed _____ per cent __ 35
Toluol _____ do ____ 65

If desired, other solvents such as acetone, methyl isobutyl ketone, etc. or other diluents such as benzol, petroleum naphtha and hydrogenated petroleum diluents, and other resins such as dammar and mastic may be incorporated in any of the above formulae. In adding such materials, however, care should ordinarily be observed not to incorporate substantial amounts of materials tending to increase the viscosity or accelerate the rate of gelling of the solution such as, for example, alcohols which when present only to the extent of 1 or 2% of the solvent portion of the thinner will cause a marked increase in the viscosity and will influence the gelling tendency of the solution.

Now having described my invention, what I desire to claim is:

1. A coating composition comprising a tough and strong artificial resin resulting from the conjoint polymerization of a vinyl halide with a vinyl ester of a lower aliphatic acid, said resin being dissolved in a sufficient quantity of a volatile solvent comprising a nitroparaffin having in excess of one carbon atom, to make a readily flowable composition adapted to produce resistant, adhesive and stable protective or ornamental surface coatings.

2. A coating composition comprising a tough and strong artificial resin resulting from the conjoint polymerization of a vinyl chloride with vinyl acetate, said resin being dissolved in a sufficient quantity of a volatile solvent comprising a nitroparaffin having in excess of 1 carbon atom to make a readily flowable composition adapted to produce resistant, adhesive and stable protective or ornamental surface coatings.

CHARLES BOGIN.